(No Model.)
E. C. SMITH.
SAW.
No. 526,642.  Patented Sept. 25, 1894.
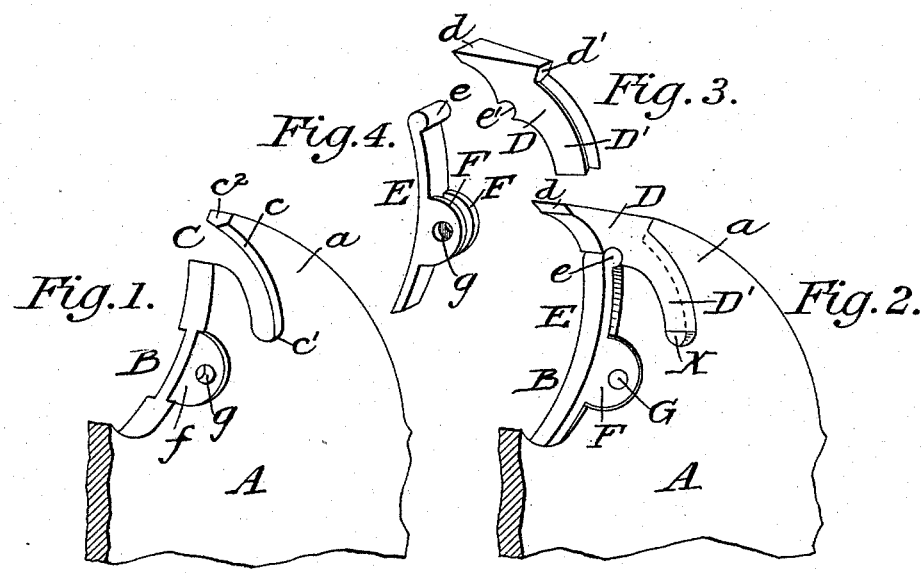
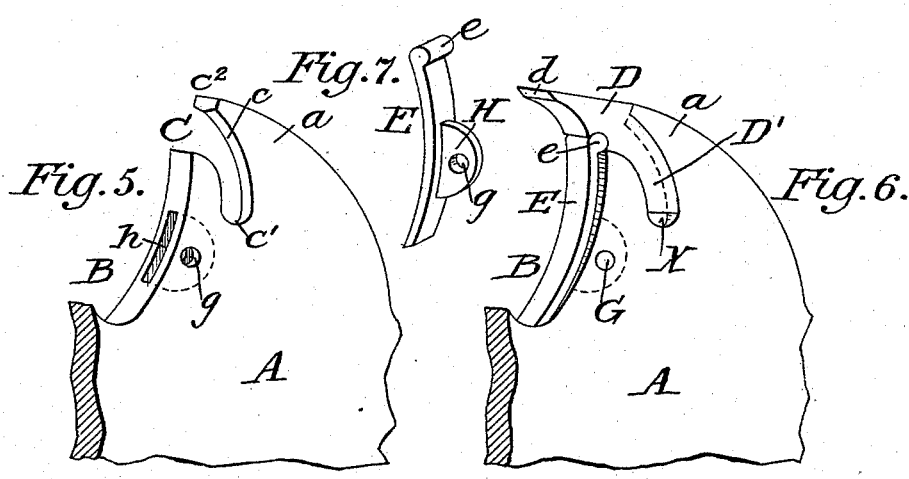
Fig. 8.
Witnesses:
A. N. Jesbera.
G. M. Copenhaver.
Inventor:
Eugene C. Smith,
by William John Littell,
his Attorney.

UNITED STATES PATENT OFFICE.

EUGENE C. SMITH, OF NEW YORK, N. Y.

SAW.

SPECIFICATION forming part of Letters Patent No. 526,642, dated September 25, 1894.

Application filed March 23, 1894. Serial No. 504,878. (No model.)

*To all whom it may concern:*

Be it known that I, EUGENE C. SMITH, a citizen of the United States, and a resident of New York, in the county and State of New York, have invented a certain new and useful Improvement in Saws, of which the following is a specification.

My invention relates to circular saws of that type which are provided with removable bits. The object of my invention is to provide means for securely retaining the bits in the saw plate notwithstanding the expansion of the plate during operation, and which will also serve as shields to prevent wear of the rear face of the gullets of the saw.

Heretofore much difficulty has been encountered in securing the bits to the saw blade in such a manner as to retain the bits firmly in place when the saw is run at high speed. It is well known to those skilled in the art that the means which have been commonly employed for securing the bits in position, such as keys, rivets, and also "shanks" which fit in segmentally-curved gullets in the saw plate, are objectionable in that when the saw is running at high speed the saw plate expands (enlarging all openings or recesses in the plate), thus causing the loosening of the bits and in some instances the discharging of the bits from the saw. A further objection to many of the various devices which have been devised is that they require cutting away of a large part of the saw plate, thereby weakening the teeth proper, and also necessitating a reduction in the number of saw teeth. The purpose of my invention is to entirely overcome these defects, and to this end it consists in the provision of improved means for securing the bits, such means occupying but little space and avoiding the necessity for material increase in the size of the gullets, and which will also act as shields to prevent wear of the rear edge of the gullets, as will be hereinafter more fully described.

In the drawings—Figure 1 is a perspective view of a part of the circular saw plate, showing the construction of one of the teeth thereof as adapted for the attachment of the bit and my improved securing means. Fig. 2 is a similar view, with the bit and securing means attached. Figs. 3 and 4 are respectively detail perspective views of the bit and the securing device. Fig. 5 is a perspective view similar to Fig. 1, illustrating a modification. Fig. 6 is a perspective view of the modified construction, the parts being assembled. Fig. 7 is a detail perspective view of the modified securing device. Fig. 8 is a detail perspective view of the securing rivet.

Referring to the drawings, A designates the saw plate, which has at its periphery a series of teeth proper, $a$, forming intervening gullets or saw-dust chambers, B. Each tooth $a$ is provided with a recess or socket, C, having its rear or outer edge formed with a V-shaped longitudinal way, $c$, said recess or socket extending from the front edge of the tooth rearwardly and downwardly terminating in a rounded lower end, $c'$. The opening of the recess or slot is located just below the extreme outer end of the tooth, leaving a shoulder, $c^2$.

D designates the bit, which is provided with a chisel point, $d$, and with a shank D′, corresponding to and fitting closely within the recess or socket C, said shank being of less length than the latter, whereby an opening, X, is left below the shank when the bit is in position, for the insertion of a suitable instrument for extracting the bit when desired. The shank D intersects the bit proper below the outer edge thereof, forming a shoulder, $d'$, corresponding to and engaging the shoulder $c^2$ of the tooth, said outer edge of the bit being curved to conform to the contour of the tooth.

For firmly securing the bit in position I employ a plate, E, constructed of spring metal and secured stationarily, intermediate its ends, to the rear face of the gullet above the bottom thereof, said plate exerting its spring tension against the bit to retain the same securely in position under all conditions of the saw plate. To this purpose, the outer end of the plate E is provided with an inwardly-projecting rib or stud, $e$, which engages a corresponding recess, $e'$, in the front face of the bit adjacent to the shank D of the latter.

The preferred manner of securing the plate E to the saw tooth is illustrated in Figs. 1 to 4. In this instance, the plate E is provided at each side, intermediate its ends, with an inwardly projecting ear, F F, which are received by corresponding recesses, $f f$, provided in the faces of the saw plate and which form seats for the ears. Through the ears F and the seats therefor are provided eyes, $g$, for the insertion of a securing rivet or screw, G.

While I have herein described the preferred means for securing the plate to the saw-tooth, it will be obvious that this precise construction is not essential to my invention, and that numerous legitimate modifications may be made therein. For example, in Figs. 5 to 7 the ears F and recesses $f$ are dispensed with, and the plate E provided with a single central ear, H, which is received by a recess or slot, $h$, in the saw plate and secured by a rivet or screw in the manner before described.

In practice, the bit is first inserted in its recess or socket. The plate F is then placed in position and pressed inwardly at the securing point until the eyes $g$ register, when the rivet or screw is inserted and secured. To remove the bit, a suitable tool is inserted in the opening X below the shank of bit, and manipulated to extract the bit, the upper arm of the plate E yielding sufficiently to permit the disengagement of the stud or rib $e$ from the screw $e'$.

The office and advantages of my invention will be manifest. It is well known that when circular saws are in operation they expand, and under high speed this expansion is very material, causing enlargement of all openings or recesses in the saw, and, under the ordinary conditions, the loosening of the bits and their securing devices necessarily follows. It is the purpose of the present invention to overcome these defects and the resultant disadvantages, and this is effected in the following manner: When, as the saw expands, the rivet or screw-eyes and bit sockets gradually enlarge under increasing speed of the saw, each plate E draws outwardly at its securing point from the tooth, thus retaining the securing rivet or screw tightly against the front sides of the eye or eyes in the saw tooth through which said rivet or screw passes. At the same time, the upper end of said plate E, by reason of its spring tension, exerted against the front face of the bit, holds the latter firmly against the rear wall of its socket notwithstanding the enlargement of its socket, and thereby at all times retains the bit against loosening or displacement, and entirely compensates for the expansion and contraction due to the varying speed at which the saw may be operated. It will be noted, in this connection, that the upper arm of the plate is free from contact with the front face of the saw tooth, and that the play of said arm is amply sufficient to compensate for any expansion which could possibly take place. It will be further noted that the improved results are due to two factors—the exertion of the spring tension of the plate E directly against the bit, and the arrangement of this plate at but one side only (the rear side) of the gullet. Were this latter not the case, and the tension of the spring exerted between the two opposite walls of the gullet, the power of the spring would be lost upon expansion of the gullet. The plate E also serves as a shield to prevent wear of the front face of the gullet, and to this end the said plate is made slightly wider than the saw plate, affording the necessary clearance for the sawdust.

I claim as my invention—

1. As an improvement in circular saws having removable bits, means for securing the bits, consisting of a spring plate located and secured at the rear face of each of the gullets and terminating substantially at the bottom of the latter, each of said plates exerting its spring tension directly against the bit; substantially as set forth.

2. As an improvement in circular saws, the combination, with the teeth provided each with a rearwardly and downwardly extending socket, and a removable bit having a shank fitting in said socket, said bit being provided with a recess in its front face, of a spring securing-plate secured at the rear side only of the gullet and intermediate the ends of said plate, whereby a drawing action is exerted at said securing point, through the tension of the plate, to retain the joint between the saw and plate rigid through expansion or contraction of the saw, the outer arm of said plate being free from contact with the face of the gullet and provided at its end with a stud or rib engaging said recess; substantially as set forth.

In testimony that I claim the foregoing as my invention I have signed my name, in presence of two witnesses, this 6th day of January, 1894.

EUGENE C. SMITH.

Witnesses:
PATRICK A. FAY,
BERNARD J. ISECKE.